Figure 1:
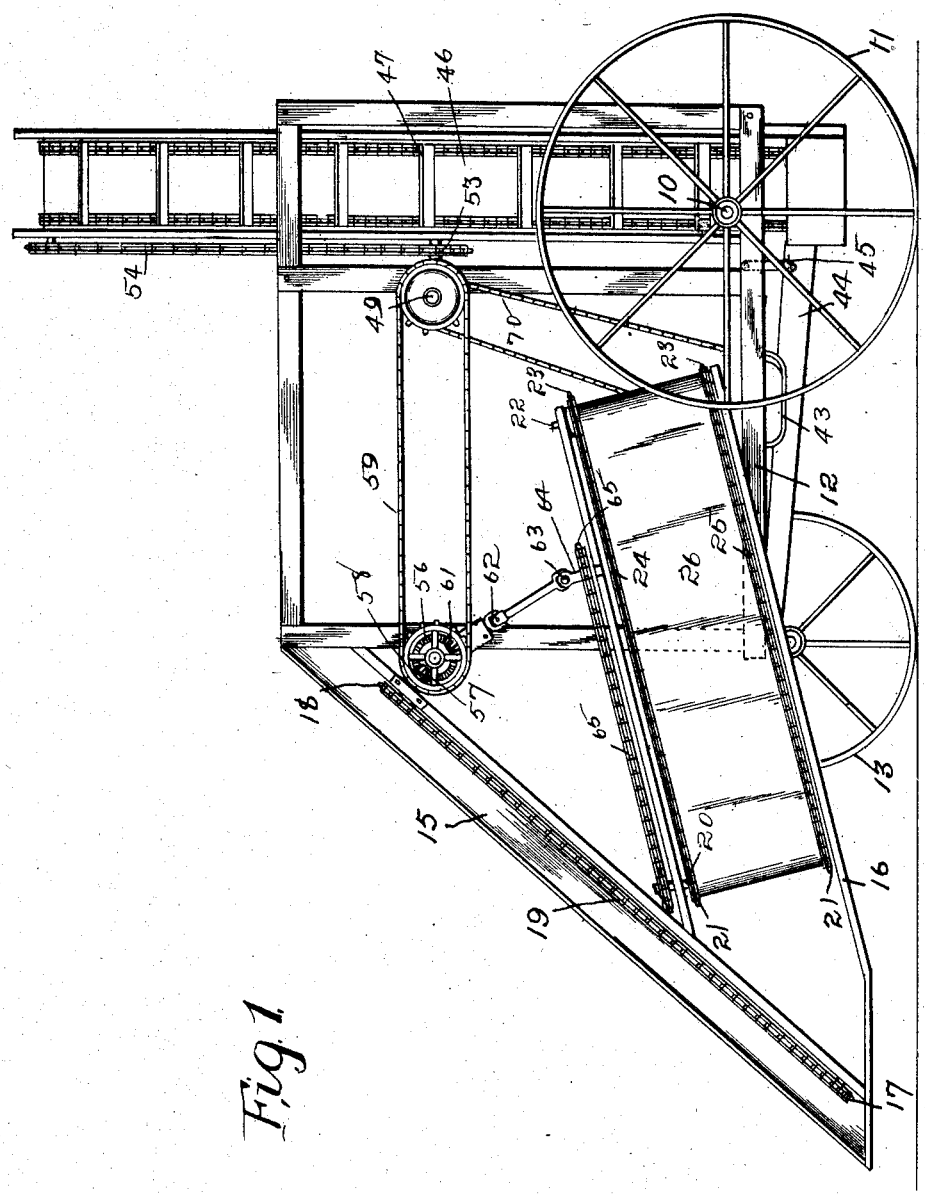

J. TJOSSEM.
CORN HARVESTER.
APPLICATION FILED AUG. 10, 1908.

974,311.

Patented Nov. 1, 1910.
4 SHEETS—SHEET 1.

Witnesses
A. G. Hague.
F. C. Dahlberg.

Inventor
John Tjossem
by Dwight Lane attys

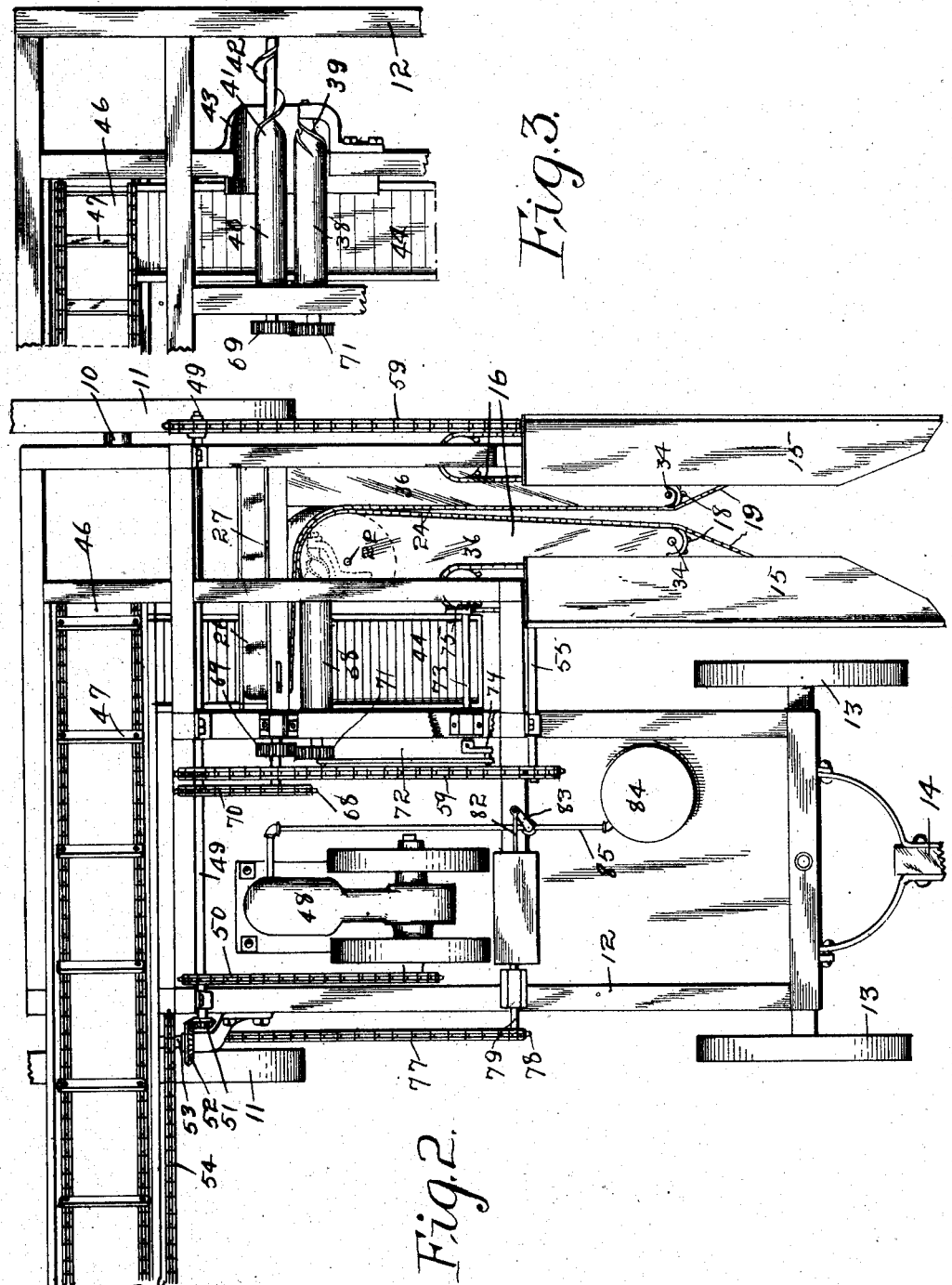

J. TJOSSEM.
CORN HARVESTER.
APPLICATION FILED AUG. 10, 1908.
974,311.
Patented Nov. 1, 1910.
4 SHEETS—SHEET 3.
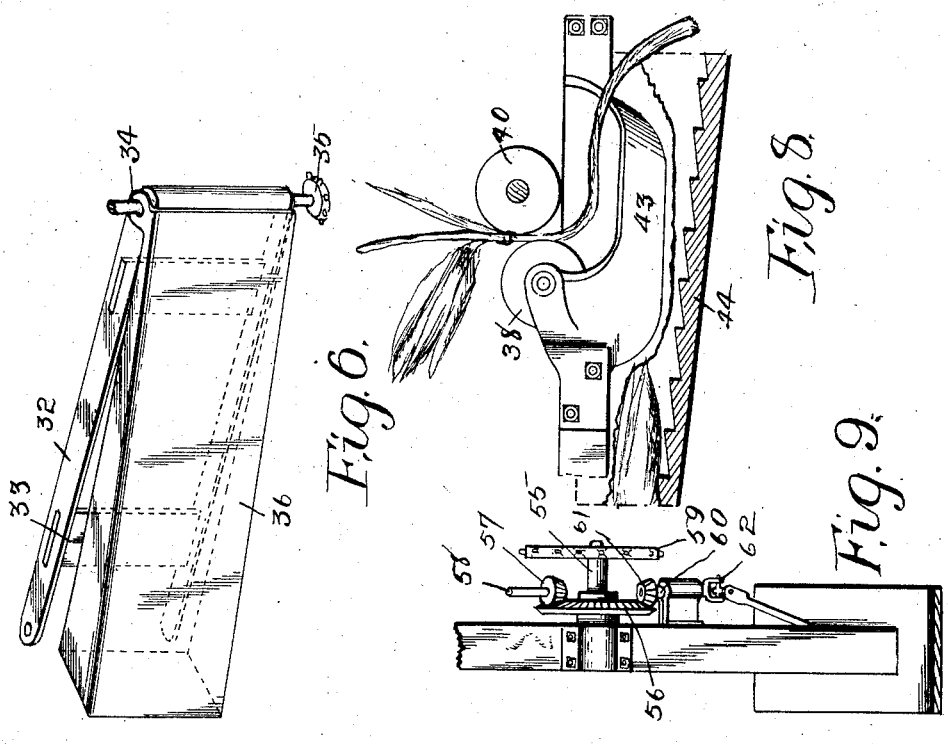
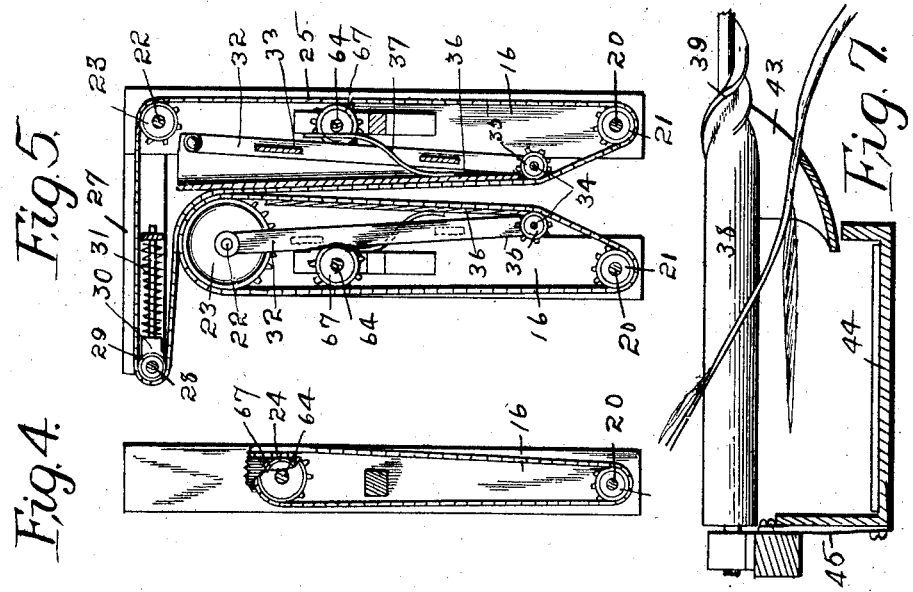
Witnesses
A. G. Hague
F. C. Dahlberg.
Inventor
John Tjossem.
by Orwig & Lane, att'ys J. TJOSSEM.
CORN HARVESTER.
APPLICATION FILED AUG. 10, 1908.
974,311.
Patented Nov. 1, 1910.
4 SHEETS—SHEET 4.
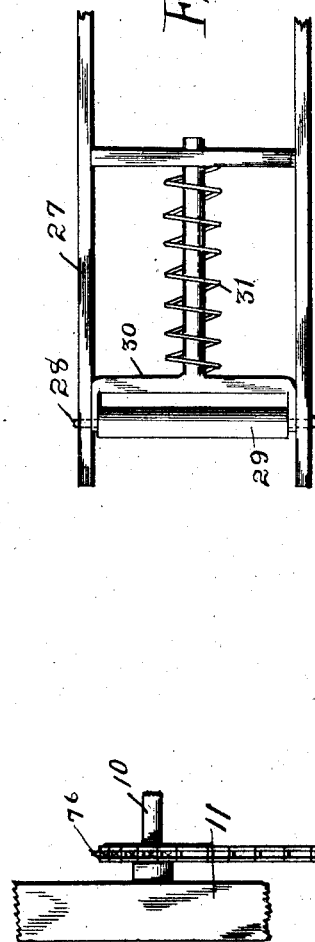
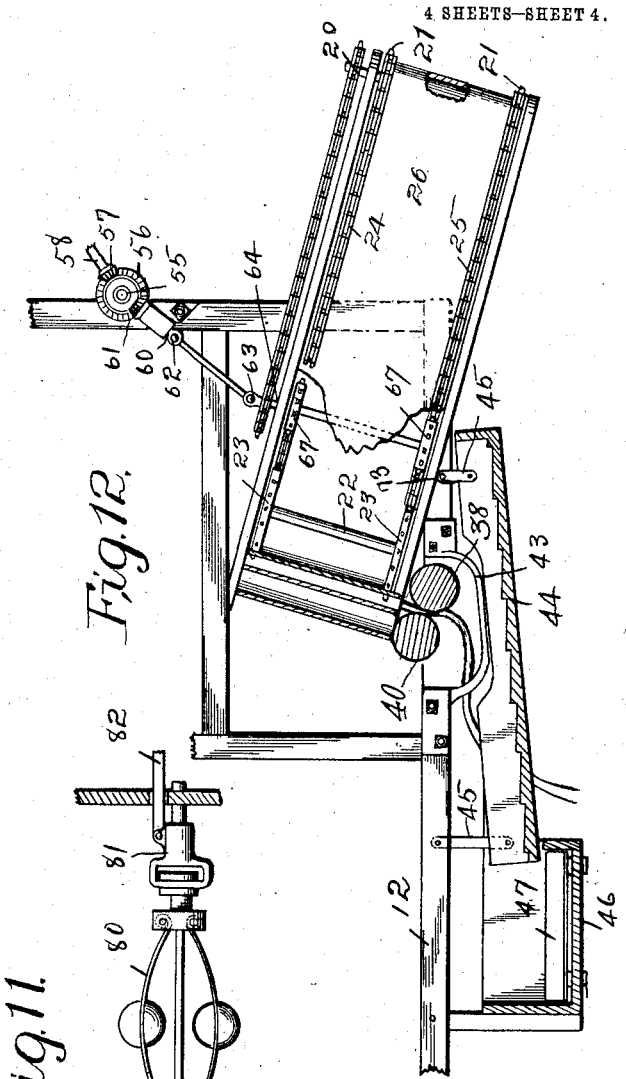
Witnesses
A. G. Hague.
F. C. Dahlberg.
Inventor
John Tjossem.
by Orwig & Lane, attys

UNITED STATES PATENT OFFICE.

JOHN TJOSSEM, OF PAULLINA, IOWA.

CORN-HARVESTER.

974,311. Specification of Letters Patent. Patented Nov. 1, 1910.

Application filed August 10, 1908. Serial No. 447,692.

*To all whom it may concern:*

Be it known that I, JOHN TJOSSEM, a citizen of the United States, residing at Paullina, in the county of O'Brien and State of Iowa, have invented a certain new and useful Corn-Harvester, of which the following is a specification.

The object of my invention is to provide a corn harvester of simple, durable and inexpensive construction of the class designed to pass over a field and to remove the ears from the standing stalks of corn.

A further object is to provide improved means for bending over laterally the tops of the standing stalks of corn and for introducing them between two short snapping rollers arranged transversely of the machine frame.

A further object is to provide improved snapping rollers arranged to co-act with the means for bending the stalks laterally in such a manner that the stalks will be fed to them and forced between them with a minimum of applied power and without tearing the stalks up by the roots.

A further object is to provide means for collecting shelled corn from the snapping rollers and for carrying it to the elevator chute.

A further object is to provide an explosive engine or other motive power for a device of this kind, arranged to drive all of the operative parts of the harvester including the snapping rollers and so arranged that the speed of the engine or other motor will be automatically governed or controlled by the speed of the supporting wheels of the harvester.

A further object is to provide improved means for engaging corn stalks and holding them in proper position with relation to the harvester and for inclining their upper ends laterally toward the snapping rollers.

My invention consists in the construction, arrangement and combination of the various parts of the device, whereby the objects contemplated are attained, as hereinafter more fully set forth, pointed out in my claims, and illustrated in the accompanying drawings, in which—

Figure 1 shows a side elevation of corn harvester embodying my invention. Fig. 2 shows a top or plan view of same. Fig. 3 shows an enlarged, detail plan view, illustrating the snapping rollers and the means for carrying shelled corn and ears of corn from the snapping rollers to a point of discharge. Fig. 4 shows a top or plan view of one of the frames for supporting one of the corn stalk engaging belts to illustrate the means for driving the belt. Fig. 5 shows a horizontal, sectional view of the two adjacent corn stalk engaging belts and connected parts to illustrate the yielding frames for holding the adjacent portions of the belts toward each other. Fig. 6 shows a detail, perspective view of one of the yielding frames for holding the corn stalk engaging belts toward the adjacent belt. Fig. 7 shows an enlarged, detail view partly in section of the rear one of the snapping rollers to illustrate the arrangement of the trough for receiving shelled corn and ears of corn from the snapping rollers. Fig. 8 shows an enlarged, detail view, partly in section, looking toward the receiving ends of the snapping rollers to illustrate the arrangement of the snapping rollers relative to each other, and also the arrangement of the chute for receiving shelled corn and ears of corn from the snapping rollers. Fig. 9 shows an enlarged, detail view illustrating the means for imparting motion to the upper and lower corn stalk engaging devices. Fig. 10 shows an enlarged, detail view of the spring actuated belt tightener. Fig. 11 shows an enlarged, detail view illustrating the means for controlling the engine by power from the supporting axle, and Fig. 12 shows a detail, sectional view illustrating the arrangement of one of the corn stalk supporting belts and the snapping rollers.

Referring to the accompanying drawings, I have used the reference numeral 10 to indicate the rear axle upon which the supporting wheels 11 are fixed.

The frame of the machine is indicated by the numeral 12, and at the forward end of the frame are the supporting wheels 13 and tongue 14.

The harvester is designed to be advanced over a field at the side of a row of corn and the frame is so shaped as to receive a row of standing corn stalks at one side of the forward supporting wheels.

For the purpose of picking up corn stalks and holding them in proper position relative to the harvester, while the harvester is moving past them, I provide two corn stalk engaging and supporting devices, one designed to stand on each side of a row of corn and each comprising a frame 15 extending upwardly and rearwardly at an angle of about forty-five degrees and containing a conveyer chain hereinafter described, and also a frame 16 extending rearwardly and upwardly at an angle of about fifteen degrees and containing an endless belt.

At the forward lower portion of each of the frames 15 is a sprocket wheel 17 and at the rear upper portion is a sprocket wheel 18. A sprocket chain 19 is passed around these wheels and is arranged within the frame 15, so that it will engage stalks of corn and move their upper ends to position where the stalks will stand substantially upright in the field.

At the forward end of each of the frames 16 is a shaft 20 having two sprocket wheels 21 thereon, and at the rear end is a shaft 22 having two sprocket wheels 23 thereon. Two sprocket chains 24 and 25 are passed around these sprocket wheels and a belt 26 is connected to said sprocket chains.

The foregoing description applies particularly to the belt 26 that is adjacent to the forward supporting wheels. The outer belt differs from the inner one in that, at the rear end of the outer frame 16 is a supplemental frame 27 extended inwardly toward the center of the machine. The top of said frame is inclined forwardly making an angle of about fifteen degrees with respect to a horizontal plane. At the inner end thereof is an upright shaft 28 having rollers 29 thereon around which the chains 24 and 25 and the belt 26 are passed. This roller 29 is mounted in a sliding frame 30 yieldingly held by a spring 31 in a direction toward the center of the machine frame to tighten the belt 26 as shown in Fig. 10.

The means for driving the corn stalk engaging chains and belts will be hereinafter set forth. In use with this portion of the device, it is obvious that when the machine is being advanced relative to a row of corn stalks and the chains and belts are being driven at the proper speed, that corn stalks will be picked up and held in substantially vertical positions by said means until they reach the rear end of the inner one of the belts 26 and when at this point the upper ends of the corn stalks will be inclined laterally toward the central portion of the harvester.

It will be seen by referring to Fig. 1, that the chains 19 will be released from their engagement with the corn stalks before the stalks reach the rear end of the inner one of the conveyer belts.

It is desirable that those portions of the belts 26 that are adjacent to each other be yieldingly held toward each other. To provide for this, I place in each of the frames 16 two arms 32 connected by the braces 33 and pivoted at their rear ends to the frame 16 as clearly shown in Fig. 5. At the forward end of each of said arms is a shaft 34 having sprocket wheels 35 at its ends. Pivoted to the shaft 34 is a belt engaging plate 36 extended rearwardly, and fixed at the central portion of the frame 16 is a spring 37 to engage the adjacent face of the plate 36, said spring being arranged to yieldingly hold the plate 36 in a direction toward the adjacent plate 36. These plates are designed to engage the belts 26 and the sprocket wheels 35 are designed to engage the sprocket chains 24 and 25. In this way the adjacent portions of the belts are yieldingly held toward each other and the belts are prevented from inclining outwardly away from each other by means of the flat plates 36 against which they rest.

The snapping rollers are arranged adjacent to and below the rear end of the frame 16 that is nearest the center of the machine. The forward snapping roller is indicated by the numeral 38 and comprises a cylindrical body portion having its receiving end slightly tapered, and provided with a short spiral rib 39. The rear roller 40 is arranged parallel with the front roller and its outer end is tapered at 41 adjacent to the tapered outer end of the forward roller. This rear roller is provided with a spiral rib 42 extended outwardly a considerable distance beyond the adjacent end of the roller 38 and the roller 40 is arranged above the roller 38 and in the rear thereof as clearly shown in Fig. 8.

Both rollers are extended at substantially right-angles to a fore and aft line through the machine and are so arranged that when the stalks of corn reach the rear end of the inner belt 26 their upper ends will be inclined laterally by the outer belt 26 and the stalks will be forced by the spiral rib 42 to enter between the snapping rollers.

The spiral rib 39 will co-act with the rib 42 in forcing the stalks between the rollers. Then as the rollers continue to rotate, the stalks will be forced downwardly between them and the ears of corn will be snapped from the stalks. In practical use with this portion of the device, the stalks will be inclined toward the snapping rollers by the belt conveyers. The spiral rib on the rear snapping roller will first engage the stalks and move them to position between the snapping rollers, then as the rollers rotate they will force the stalk downwardly between the rollers and thus remove the ears and at the same time they will force the stalks downwardly and toward the receiving ends of the rollers so that there will be no tendency to pull the stalks from the ground, and so that the stalks need not be broken or crushed by the rollers. By having the rear roller 40 elevated relative to the forward roller as shown, it is obvious that the stalks can be passed through between the rollers without bending so much as would be necessary if the rollers were in the same plane. In Figs. 7, 8, and 12, the action of the rollers upon the corn stalks is clearly illustrated.

One of the serious objections to the use of snapping rollers in corn harvesting machines, is that they frequently waste a considerable amount of corn by shelling the corn from the ears while passing through the snapping rollers. In order to avoid this objection, I have provided a chute 43 arranged below the receiving ends of the rollers and extending to a point of discharge. This chute is open at its top and its receiving end is curved downwardly at its central portion as clearly shown in Fig. 8, so that the chute will not in any way interfere with the admission of corn stalks between the rollers. The forward end of the chute inclines upwardly to the center of the forward roller 38 as shown in Fig. 8.

Beneath the central portions of the snapping rollers is a shaking trough 44 supported by hangers 45 and inclined downwardly toward the rear of the machine. The chute 43 is arranged to discharge into said trough and I have provided means for shaking this trough to advance the ears of corn toward its discharge end as will hereinafter appear. This trough 44 discharges into a conveyer chute 46 at the rear end of the main frame which conveyer chute extends upwardly and laterally and is provided with a conveyer 47.

Mounted upon the frame 12, is an explosive engine 48, or other suitable motive power. I have provided for driving all of the operative parts of the machine from this engine as follows: In the rear of the engine is a shaft 49 connected by a sprocket gearing 50 with the engine. This shaft has a beveled gear wheel 51 on it in mesh with a beveled gear wheel 52, which latter is fixed to a shaft 53 arranged for driving the conveyer 47 by means of the sprocket gearing device 54.

The chains 19 are driven as follows: Referring to Fig. 9, the numeral 55 indicates a short shaft having a beveled gear wheel 56 thereon. In mesh with the beveled gear wheel 56 is a beveled pinion 57 fixed to the shaft 58, which shaft also carries the sprocket wheel 18 of one of the chains 19. A similar arrangement is provided for driving each of the chains 19. The said shaft 55 is connected by means of a sprocket gearing device 59 with the shaft 49.

For driving the belts 26, I have provided the following mechanism: The numeral 60 indicates a short shaft having a beveled pinion 61 thereon in mesh with the beveled gear wheel 56. This shaft is provided with a universal joint 62 and is also connected by the universal joint 63 with a shaft 64 in one of the frames 16. This shaft 64 is connected by means of a sprocket gearing device 65 with the shaft 20 at the forward end of the belt conveyer. As shown in Fig. 12, the shaft 64 is also provided with two sprocket wheels 67 arranged to engage the sprocket chains of the belt conveyer to aid in driving same.

I arrange for operating the snapping rollers as follows: On the rear snapping roller is a sprocket wheel 68 and a pinion 69. The former is connected by a sprocket gearing device 70 with the shaft 49 and the latter is in mesh with a similar pinion 71 on the end of the forward roller.

I provide for operating the shaking trough 44 by means of a pitman rod 72 connected with the pinion 71 and with a crank shaft 73, which latter is connected by means of a crank 74 and link 75 with the trough 44, as shown in Fig. 2.

I have provided means for automatically controlling the speed of the engine, so that it will operate at a speed proportioned to the rate of movement of the harvester to thereby cause the corn stalk engaging and supporting devices and the snapping rollers to move at the proper rate of speed relative to the advance of the machine over the field as follows: Fixed to the axle 10, is a sprocket wheel 76 connected by a sprocket chain 77 with a sprocket wheel 78, which latter is fixed to the shaft 79 of the centrifugal ball governor 80. This governor is provided with a sliding sleeve 81, the position of which is determined by the speed of rotation of the governor balls. Connected with this sliding sleeve 81 is a rod 82, which rod is connected to a valve stem 83. The numeral 84 indicates a gasolene tank and communicating therewith is a supply pipe 85 leading to the engine 48. The valve 83 is mounted in this pipe and is so arranged that the supply of gasolene to the engine will be regulated by the ball governor 80, that is to say, when the harvester is being advanced across the field at a certain speed, such, for instance, as the speed with which the average draft animal usually draws a farm implement across a field, then the governor 80 will be operated to hold the valve 83 in position for controlling the engine, so that it will drive the operative parts of the harvester at a rate of speed proportioned to the rate of travel of the harvester over the field.

If there is an increase in the speed of the harvester as it travels over the field, then the ball governor will operate the valve in such a manner as to increase the speed of the engine proportionately, and when there is a decrease in the rate of travel of the machine over the field, the engine will be proportionately slowed down.

By thus combining the engine with a machine of this kind, a machine may be constructed of comparatively light weight, and this machine may be easily advanced over a field by two draft animals, whereas in machines of this kind where power is derived from the supporting wheels, it is usually necessary to employ from four to eight draft animals and the machine must be made much stronger and heavier in construction and consequently must be more expensive.

I have found that in actual use a gasolene engine is well adapted for the purpose of driving the machinery and is light in weight and easily controlled by the governor.

When the machine is advanced over a field, the corn stalks will be picked up and held in substantially upright positions until inclined laterally by the belt and conveyers, then they will be received between the rollers and the ears snapped from them and they will be moved out from between the rollers and left standing in the field without being broken or crushed to any material extent, the operation of the conveyers and snapping rollers being such that corn stalks may be forced through between the rollers and the ears removed from them with a minimum of applied power and without tending to tear up the stalks by the roots.

I claim as my invention:

1. In a machine of the class described, the combination of a conveyer, having one side arranged for moving rearwardly, a second conveyer adjacent to the first, having its side nearest the first arranged for moving rearwardly, and having its rear portion arranged for moving laterally in the rear of the first conveyer, said conveyers being arranged to receive corn stalks between them and to hold them in substantially upright positions and said conveyers also being inclined laterally at their rear ends to incline the upper ends of the corn stalks laterally after they have passed beyond the first mentioned conveyer.

2. In a machine of the class described, the combination of an endless belt conveyer arranged to have one side move rearwardly, a second endless belt conveyer, arranged to have its side adjacent to the first conveyer move rearwardly and then laterally in the rear of the first conveyer, said second conveyer being arranged in engagement with the first conveyer at the point where it turns from its rearwardly moving position to its laterally moving position.

3. In a machine of the class described, the combination of a frame, an endless conveyer belt passed around the frame and arranged to have one side move rearwardly, a second frame having a portion substantially parallel with the first frame, and also a part extending laterally in the rear of the first frame, and a conveyer passed around the ends of the second frame with the central portion of the second conveyer in engagement with the rear portion of the first conveyer.

4. In a machine of the class described, the combination of a conveyer, having one side arranged for moving rearwardly, a second conveyer adjacent to the first, having its side nearest the first arranged for moving rearwardly, and having its rear portion arranged for moving laterally in the rear of the first conveyer, said conveyers being arranged to receive corn stalks between them and to hold them in substantially upright positions and said conveyers also being inclined laterally at their rear ends to incline the upper ends of the corn stalks laterally after they have passed beyond the first mentioned conveyer, and means for yieldingly holding the adjacent parallel portions of said conveyer belts toward each other.

5. In a machine of the class described, the combination of an endless belt conveyer arranged to have one side move rearwardly, a second endless belt conveyer, arranged to have its side adjacent to the first conveyer move rearwardly and then laterally in the rear of the first conveyer, said second conveyer being arranged in engagement with the first conveyer at the point where it turns from its rearwardly moving position to its laterally moving position, and means for yieldingly holding the adjacent parallel portions of said conveyer belts toward each other.

6. In a machine of the class described, the combination of a frame, an endless conveyer belt passed around the frame and arranged to have one side move rearwardly, a second frame having a portion substantially parallel with the first frame, and also a part extending laterally in the rear of the first frame, and a conveyer passed around the ends of the second frame with the central portion of the second conveyer in engagement with the rear portion of the first conveyer, and means for yieldingly holding the adjacent parallel portions of said conveyer belts toward each other.

7. In a device of the class described, the combination of a frame, an endless conveyer belt passed around the frame, a second frame having a part arranged substantially parallel with the first, and an extension at the rear end thereof at right-angles, a conveyer belt passed around the second frame and the extension, said conveyer being in engagement with the rear portion of the first mentioned belt, a roller at the outer end of said extension having the belt passed around it and a spring arranged to yieldingly hold the roller to position for tightening the belt and for holding a portion of it in engagement with the first mentioned belt.

8. In a device of the class described, the combination of a frame, an endless conveyer passed around the frame, two arms pivoted within the frame near its rear end and extended forwardly, a flat plate pivoted to the forward ends of said arms and extended rearwardly in engagement with the belt conveyer, and a spring in engagement with the central portion of said flat plate, for normally holding it toward the adjacent portion of the belt conveyer.

Des Moines, Iowa, May 22, 1908.

JOHN TJOSSEM.

Witnesses:
  LOUIS WOLLENBERG,
  GEO. RAW.